United States Patent
Weinberger et al.

(10) Patent No.: US 10,781,139 B2
(45) Date of Patent: Sep. 22, 2020

(54) JOINT COMPOUND WITH SULFONATED STARCH

(71) Applicant: UNITED STATES GYPSUM COMPANY, Chicago, IL (US)

(72) Inventors: Renee J. Weinberger, Waukegan, IL (US); Runhai Lu, Wauconda, IL (US); Yijun Sang, Oak Park, IL (US); Guy L. Rosenthal, Wheaton, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 197 days.

(21) Appl. No.: 15/914,633

(22) Filed: Mar. 7, 2018

(65) Prior Publication Data
US 2018/0354852 A1 Dec. 13, 2018

Related U.S. Application Data

(60) Provisional application No. 62/516,348, filed on Jun. 7, 2017.

(51) Int. Cl.
| | | |
|---|---|---|
| C04B 26/00 | (2006.01) | |
| C04B 26/28 | (2006.01) | |
| C04B 14/28 | (2006.01) | |
| C08B 31/06 | (2006.01) | |
| C08L 3/14 | (2006.01) | |
| C08L 1/28 | (2006.01) | |
| C09J 103/08 | (2006.01) | |
| C08L 3/08 | (2006.01) | |
| C08B 31/12 | (2006.01) | |
| C04B 22/00 | (2006.01) | |

(Continued)

(52) U.S. Cl.
CPC ............ *C04B 26/285* (2013.01); *C04B 14/28* (2013.01); *C04B 26/28* (2013.01); *C08B 31/063* (2013.01); *C08B 31/12* (2013.01); *C08L 1/284* (2013.01); *C08L 3/08* (2013.01); *C08L 3/14* (2013.01); *C09J 103/08* (2013.01); *C04B 22/002* (2013.01); *C04B 2103/44* (2013.01); *C04B 2111/00681* (2013.01)

(58) Field of Classification Search
None
See application file for complete search history.

(56) References Cited

U.S. PATENT DOCUMENTS

| | | | | |
|---|---|---|---|---|
| 3,179,529 A | * | 4/1965 | Hickey | ................ C04B 24/383 106/779 |
| 4,454,267 A | | 6/1984 | Williams | |

(Continued)

FOREIGN PATENT DOCUMENTS

JP S4973225 A 7/1974

OTHER PUBLICATIONS

Jianshe Chen, Food oral processing—A review, Food Hydrocolloids 23 (2009) 1-25.

(Continued)

*Primary Examiner* — Stefanie J Cohen
(74) *Attorney, Agent, or Firm* — Vorys, Sater, Seymour and Pease LLP; Pradip Sahu; Philip T. Petti

(57) ABSTRACT

Provided herein is a joint compound having a composition to allow tools to easily clean up, comprising water, at least one inert filler, and a binder comprising a sulfonated starch, and a method of preparing the joint compound.

20 Claims, 3 Drawing Sheets

(51) Int. Cl.
*C04B 103/44* (2006.01)
*C04B 111/00* (2006.01)

(56) References Cited

U.S. PATENT DOCUMENTS

| | | | | |
|---|---|---|---|---|
| 4,543,370 | A | * | 9/1985 | Porter .................. A23G 3/0205 106/146.4 |
| 4,845,152 | A | | 7/1989 | Palmer |
| 4,940,665 | A | * | 7/1990 | Iijima .................. A61K 9/1641 435/187 |
| 5,336,318 | A | | 8/1994 | Attard et al. |
| 5,746,822 | A | | 5/1998 | Espinoza et al. |
| 5,914,734 | A | * | 6/1999 | Rotering .............. B41J 2/16538 347/28 |
| 5,986,087 | A | * | 11/1999 | Schrell .................... C08B 31/12 536/102 |
| 6,476,099 | B1 | | 11/2002 | Cimaglio et al. |
| 6,545,066 | B1 | * | 4/2003 | Immordino, Jr. ..... C04B 16/082 106/602 |
| 6,673,144 | B2 | * | 1/2004 | Immordino, Jr. ....... C04B 26/02 106/270 |
| 6,841,039 | B1 | | 1/2005 | Lokietek et al. |
| 7,101,426 | B2 | | 9/2006 | Tagge et al. |
| 7,473,713 | B2 | | 1/2009 | Wantling et al. |
| 8,444,820 | B2 | | 5/2013 | Gombert et al. |
| 8,822,566 | B2 | | 9/2014 | Hargrove et al. |
| 9,057,000 | B2 | | 6/2015 | Anderson et al. |
| 9,174,881 | B2 | | 11/2015 | Climaglio et al. |
| 9,328,023 | B2 | | 5/2016 | Rosenthal et al. |
| 2003/0097962 | A1 | | 5/2003 | Hild et al. |
| 2003/0105156 | A1 | * | 6/2003 | Palepu ................. A61K 9/0019 514/449 |
| 2005/0101927 | A1 | * | 5/2005 | Joseph ................ A61F 13/8405 604/367 |
| 2010/0083879 | A1 | | 4/2010 | Francis |
| 2010/0175590 | A1 | | 7/2010 | Stevens et al. |
| 2010/0243188 | A1 | | 9/2010 | Gombert et al. |
| 2011/0100256 | A1 | * | 5/2011 | Anderson ............ C09D 103/02 106/126.1 |
| 2013/0337175 | A1 | | 12/2013 | Grussing |
| 2014/0113124 | A1 | | 4/2014 | Sang et al. |

OTHER PUBLICATIONS

Natrosol® 250 water soluble hydroxyethylcellulose, Hercules, Product Data, 33.015-E11, pp. 1-2, Jul. 2005.

Non-hazardous material safety data sheet for MicroCarb, LKAB Minerals, pp. 1-6, URL: <http://www1.lkabminerals.com/Documents/Product%20SDS/ATH%20SDS%2012-03INT,%2015-03.pdf>, retrieved from the Internet, Mar. 20, 2017.

Chiu, C., & Solarek, D. (2009). Modification of starches. In J. BeMiller & R. Whistler (Eds.), Starch. Chemistry and Technology (pp. 629-655). New York: Academic Press.

International Search Report and Written Opinion dated Sep. 10, 2018 for PCT/US2018/035962 to United States Gypsum Company filed Jun. 5, 2018.

"Modified Starches; Properties and Uses", Jan. 1, 1986, pp. 132-147, XP001013560, p. 143, paragraph IV. A.-p. 147, paragraph IV. C.

* cited by examiner

JOINT COMPOUND WITH SULFONATED STARCH

CROSS-REFERENCE TO RELATED APPLICATION

This claims the benefit of U.S. provisional patent application No. 62/516,348, entitled JOINT COMPOUND WITH SULFONATED STARCH, filed Jun. 7, 2017.

FIELD OF THE INVENTION

The present invention relates to a composition for a joint compound for use in filling and coating the joints between adjacent panels of gypsum wallboard, and a method of preparing the same. Particularly, it relates to a composition for ready-mix joint compound that allows the joint compound not to adhere to the surfaces of tools and the tools to self-clean, and a method of preparing the same.

BACKGROUND OF ART

In the construction of buildings, one of the most common elements is gypsum wallboard, often known as drywall, used in the construction of walls and/or ceilings. Walls made from gypsum wallboard are traditionally constructed by affixing the panels to wood studs or metal framing, and treating the joints between adjoining panels with a specially prepared adhesive called a joint compound. The side edges of the drywall panels are tapered, thus allowing the joint compound to be applied to the seam, between adjoining panels, in such a way that a monolithic surface is created when finished. This process generally proceeds by placing a taping joint compound within the joint formed by the abutted edges of the wallboards, and embedding a liquid-permeable paper or fiberglass tape within that compound. When dry (or set), a second coating referred to as a topping joint compound is applied over the joint, which may be subsequently lightly sanded upon drying. A third or finish coat is applied, allowed to dry, and lightly sanded to create a smooth monolithic surface that conceals any indication of where the drywall seams were. Another type of joint compound is an all-purpose grade that may be used for both embedding the joint tape and for applying the finish coats. A patterned or textured effect may be given to the finished wall and joint through the use of special application tools.

There are several categories of joint compounds. The joint compound can be supplied as a dry powder, to which an amount of water is added at the work site by the worker to give the joint compound a suitable consistency. Other joint compounds, generally referred to as "ready-mix" joint compounds, are pre-mixed with water during manufacturing. These joint compounds are generally sold in a bucket or pail in a form that is suitable for use with little or no addition of water at the job site. The joint compounds, whether dry or ready-mix, come in two general classes (1) drying-type and (2) setting-type.

Drying-type joint compounds cure through the evaporation of water, whereas setting type joint compounds chemically react with water during the curing process.

In drying-type joint compounds, the filler comprises substantially calcium carbonate ($CaCO_3$) or calcium sulfate dihydrate ($CaSO_4\text{-}2H_2O$, also referred to as gypsum). In current construction practices, generally it is preferred to use a ready-mix, pre-wetted, drying-type joint compound which contains either a calcium carbonate or gypsum filler. Prior to use (generally during manufacturing), the filler and a binder (along with several other known ingredients) are mixed with water. After application, when the water dries, i.e., evaporates, a dry, relatively hard cementitious material is left behind. Drying-type joint compounds have the advantage of ease of use, as they typically come in a ready mixed form, with water being added and mixed by the manufacturer.

In setting-type joint compounds, at least a substantial portion of the filler material is calcium sulfate hemihydrate ($CaSO_4\text{-}\frac{1}{2}H_2O$, also referred to as calcined gypsum, stucco or plaster of Paris). When water is added to the setting type powder, it reacts with the calcium sulfate hemihydrate via a hydration reaction to form an interlocking matrix of calcium sulfate dihydrate crystals. The interlocking crystal matrix gives the compound increased strength. The benefit of a setting type joint compound over a drying-type is the overall strength of the finished joint, resulting in less shrinking and cracking, as well as an independence from having to wait for the joint compound to be completely dry prior to further finishing.

Ready-mix setting type joint compound is a third type of joint compound which combines the setting action of a calcium sulfate hemihydrate based compound with the ease of use of a ready mixed compound. Ready-mix, setting-type joint compound generally comprises an aqueous slurry of calcium sulfate hemihydrate and a set retarding agent.

Manufactured as drying-type compounds or setting type compounds, joint compounds at the time of use are wet, thick paste-like materials. The joint compound "mud" is used in conjunction with a special paper tape to form smooth "invisible" connecting joints when gypsum wallboard is installed during the fabrication of interior wall and ceiling surfaces in home and commercial construction. This compound is also used as "spackle" to finish the slight indentations formed where nails or screws are used to attach the wallboard to wood or metal support structures.

Drying type joint compounds are generally formulated with fillers of calcium carbonate, binders such as starch, vinyl acetate or acrylic resins, preservatives such as bactericides, thickeners, stabilizers, and/or suspending agents or dispersants, optionally with lightweight additives. Binders are used to enhance the adhesion of the joint compound to its substrate, typically drywall.

Starch or a modified starch has been used as binder or thickener in wallboards or joint compounds. For example, some starches have a capacity for absorbing relatively high amounts of water (high water-carrying) whereas others (low water-carrying) do not have this characteristic. Both of these types of starches generally have the ability to function as binder. However, the high water-carrying starch is used typically in a relatively small amount for the purposes of its water retention and/or thickening properties, but when used in a relatively small amount, the binding properties of such starches are not exhibited to any significant degree. If the high water-carrying starch is used in a larger amount where its binding properties become significant, then it can affect too great a thickening of the composition. Accordingly, such starches are generally used in a relatively low amount and for the purpose of water retention and/or thickening and not for the purpose of binding. On the other hand, a low water-carrying starch can be used in a relatively high amount at which its binding properties are realized and at which it does not undesirably thicken the composition.

To improve workability, modified starches have been used in joint compounds. They also improve bond strength, both the strength of the bond to paper and the strength of joint compounds per se. Modified starch binders are usually present in only minor amounts, generally ranging from about 0.05% to about 5% of the total dry weight. U.S. Pat. No. 4,845,152 to Palmer discloses tape joint compounds comprising an acid converted- or enzyme modified-starch, specifically, for example, alkenyl-succinate-modified starch. U.S. Pat. No. 7,473,713 to Wantling et al. discloses sulfuric acid modified starch as an ingredient of a gypsum product. US Pat. Appln. Pub. No. 2014/0113124 to Sang et al. discloses sulfuric acid modified starch as an ingredient of joint compounds.

Further, U.S. Pat. No. 9,057,000 to Anderson discloses an adhesive or binder composition comprising a plant protein and a starch, wherein the starch is a modified starch by chemical, enzymatic, or physical modification. The composition is described that it may be used for joint compounds. For the chemical modification, it generally describes that any treatment of a starch with a chemical that results in a modified starch can be included, such as depolymerization of a starch, oxidation of a starch, reduction of a starch, etherification of a starch, esterification of a starch, cross-linking of a starch, defatting of a starch, hydrophobization of a starch, grafting of a starch with a reactive monomer or another reactive polymer to form a grafted starch interpolymer, where the etherification is generally described as including by organosulfonate. However, it does not specifically describe of the starch modification by organosulfonate, nor the effect thereof. Further, U.S. Pat. No. 6,841,039 to Lokietek discloses sulfonated starch and cationic starch but this is for paper making.

It is therefore an object of the present invention to provide a joint compound having a composition that does not adhere to tools and allows the tools, after use, are easily cleaned up, which comprises a modified starch as a binder and which shows good workability compared to a conventional ready-mix joint compound, particularly a ready-mix drying-type joint compound.

It is also an object of this invention to provide a preparation method of the joint compound allowing the tools to self-clean.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein. Thus, there is a continuing need for new and improved joint compounds having good workability as well as improved adherence property, allowing the tools easily clean-up.

SUMMARY OF THE INVENTION

One aspect of the present invention provides a joint compound having a composition to allow tools to easily clean up, comprising water, at least one filler, and a binder comprising a sulfonated starch. The sulfonated starch, typically comprises the moiety —$CH_2O$—($C_2$-$C_5$ alkyl)-$SO_3Na$ having a structure of Formulas I to VI described herein. Preferably, the sulfonated starch comprises a sodium vinyl sulfonate moiety.

The invention encompasses dry drying type joint compound sold as a dry powder and mixed with water at the worksite. The invention also encompasses ready-mix drying type joint compound sold as a mixture with water.

On a dry (water free solids) basis the sulfonated starch is present in a concentration of from about 0.05% to about 10% by weight, preferably from about 0.05% to about 5% by weight, and more preferably from about 0.1 wt. % to about 3 wt. % by weight, for example 2.9 wt. %.

The filler may comprise calcium carbonate or other heavy inorganic filler. Calcium carbonate is not required. Any similar shape inorganic inert filler is suitable (for example, ground gypsum). The filler may comprise inert lightweight fillers such as perlite, and/or other lightweight fillers. Such other lightweight fillers include inert particles such as mica or talc particles. Lightweight fillers typically have a density of 10 to 900 kg/cubic meter. In general, heavy inorganic filler has a bulk density greater than water and lightweight filler has a bulk density lighter than water.

The solids to water wt. ratio in the ready-mix formulation or when the powder is mixed at the site is generally in a range of 50:50-70:30, typically 65:35.

In an embodiment, the joint compound further comprises a thickener, a preservative, and/or a suspending agent or dispersant. The thickener comprises a cellulose compound, including ethylhydroxy ethylcellulose, hydroxypropyl methylcellulose, methylhydroxypropyl cellulose, hydroxyethyl cellulose, methylhydroxyethyl cellulose and a mixture thereof. The preservative comprises a biocide or bactericide. The suspending agent or dispersant comprises an attapulgite product.

In an embodiment, the joint compound comprises a ready-mix drying-type joint compound composition comprising calcium carbonate as a filler, a sulfonated starch as a binder, and water. The composition may be lightweight composition comprising calcium carbonate, an expanded perlite, a sulfonated starch, water, and an additional lightweight filler. It may also include gypsum (calcium sulfate dihydrate) and/or dolomite.

It may also include a thickener comprising a cellulose compound, a preservative, latex binder, polyvinyl alcohol binder, clay, pH modifier, pigment, a bactericide, fungicide, polyethylene glycol, e.g., PEG 400-PEG1000, and a suspending agent or dispersant. The composition may also have an absence of one or more of these additives.

For example a typical dry (no water) basis 92 wt. % calcium carbonate, 1.25 wt. % perlite, 3.14 wt. % attapulgite clay, 3 wt. % sulfonated starch.

The joint compound of the present invention does not adhere to the surfaces of tools allowing the tools to self-clean, after use. It allows the tools to be incredibly easily cleaned up and the compound to show good workability as compared to a conventional ready-mix joint compound.

Other advantages of the present invention may become apparent to those skilled in the art from a review of the following detailed description, taken in conjunction with the examples, and the appended claims. It should be noted, however, that while the invention is susceptible of embodiments in various forms, described hereinafter are specific embodiments of the invention with the understanding that the present disclosure is intended as illustrative, and is not intended to limit the invention to the specific embodiments described herein.

DETAILED DESCRIPTION OF THE INVENTION

All percentages and ratios used herein are by weight unless otherwise indicated.

The joint compound in a preferred embodiment of the present invention is a ready-mix drying-type joint compound having a composition to allow tools to easily clean up, comprising a binder comprising a sulfonated starch, water, at least one filler comprising calcium carbonate, a thickener comprising a cellulose compound, a preservative comprising a biocide or a bactericide, and a suspending agent or dispersant comprising a clay compound. On a dry (water free solids) basis the sulfonated starch is present in a concentration of from about 0.05% to about 10% by weight, preferably from about 0.05% to about 5% by weight, and more preferably from about 0.1 wt. % to about 3 wt. % by weight, for example 2.9 wt. %.

Lightweight fillers may be included in the composition to adjust the density of the joint compound. Other optional ingredients used in joint compounds are also suitable for addition to the joint compound of the present invention depending on the exact use and desired properties of the joint compound.

Sulfonated Starch

Any native starch or modified starch, e.g., acid modified starch, suitable in joint compounds is appropriate for being sulfonated according to the present invention. Acid modification generally involves any treatment of a starch with an acid that results in depolymerization of a starch.

A typical native starch has a 10,000,000 Daltons wt. average molecular weight. A typical acid modified starch has a wt. average molecular weight as low as 10,000 Daltons. Typical native starches are corn starch and tapioca starch. A general formula of starch is $(C_6H_{10}O_5)_n$, wherein n can be from a few hundred to a few hundred thousand glucose monomers, more typically from a thousand to a few hundred thousand glucose monomers. When it is unmodified starch n is normally more than 4,000 and it is acid modified (e.g., partially hydrolyzed starch) n is mostly between 25 and 2,500.

The polymeric backbone of a starch or a modified starch that may be used in the present invention may be branched and may comprise glucose units. Preferably, the polymeric backbone may be a starch. Suitable starches comprise amylopectin (alpha-1,4-linked glucose containing alpha-1,6-branches, see for example the structure in Formula I) and optionally amylose (alpha-1,4-linked glucose, for example the structure in Formula II). Typical sources of starch contain mixtures of these.

Sulfonation of starch may be performed with a known technique in the art. Although a known sulfonation technique may, in general, be used, a certain preferred technique is described and illustrated herein.

Figure 1:
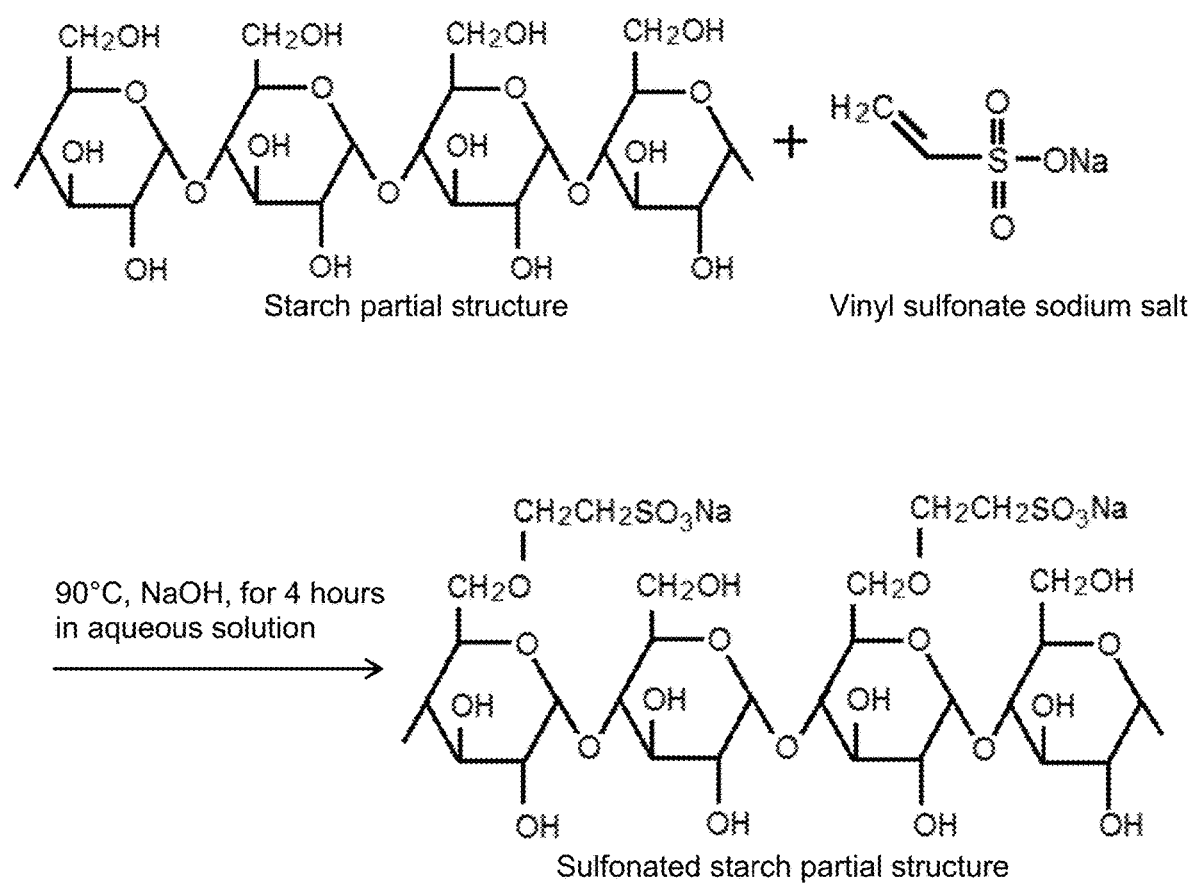
FIG. 1 illustrates a starch sulfonation process for making sulfonated starch of the present invention.

FIG. 1 illustrates a scheme for a suitable starch sulfonation process to make sulfonated starch of the present invention. As shown in FIG. 1, sulfonation reaction effects the introduction of sulfonic acid ($—SO_2OH$) or sulfonate salt ($—SO_3^-Na^+$) moiety to the starch. FIG. 1 shows a starch, represented by a starch partial structure, reacted with a vinyl sulfonate sodium salt at 90° C., NaOH, for 4 hours in aqueous solution to form the sulfonated starch reaction product, represented by a starch partial structure.

Sulfonation is preferably carried out by using a material capable of generating sulfonic acid or sulfonate salt moiety to the starch, including for example an alkyl- or arylalkyl-sulfonic acid or sulfonate group, particularly a $C_2$-$C_{18}$ or a $C_2$-$C_8$ sulfonic acid or sulfonate salt, preferably a $C_2$-$C_5$ alkyl sulfonic acid or sulfonate salt, in the presence of a base such as 10% sodium hydroxide (NaOH). Such a sulfonating material may include, but not limited to, sodium vinyl sulfonate, styrene sulfonate, 2-chloroethanesulfonic acid, 3-chloropropanesulfonic acid, or 1,3-propane sulfone. While the sulfonation may be carried out at a temperature of from about 50° C. to about 100° C., it is preferably performed at a temperature of from about 75° C. to about 95° C., more preferably at a temperature of from about 85° C. to 95° C. Most preferably, the temperature of about 90° C. is used for the sulfonation reaction with sodium vinyl sulfonate for about 4 hours as the sulfonated starch made at this temperature is often the most effective.

The sulfonation reaction occurs between the hydroxymethyl ($—CH_2OH$) group of a starch and the vinyl ($CH_2=CH—$) group of the sulfonating material (reactant), with the help of a base such as NaOH added to the aqueous solution of the starch and the sulfonating material, resulting in sulfonation on the hydroxymethyl group of the starch forming a moiety containing sulfonic acid or sulfonate salt, e.g., $—CH_2O—(C_2$-$C_5$ alkyl)$-SO_3Na$.

For example, the present invention the sulfonated starch comprises the structure of Formula I:

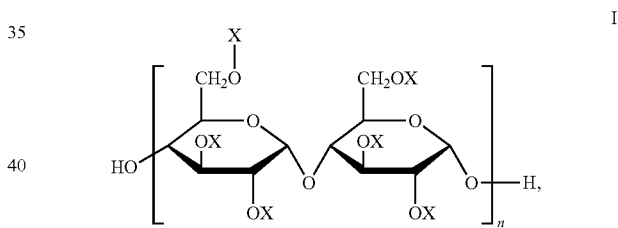

wherein X is $—RSO_3Na$ or $—H$, wherein at least one X is $—RSO_3Na$, and the R is $C_2$-$C_{18}$ alkyl or arylalkyl, and typically n is between 25-1,500,000. Although Formula I shows one substitution at a particular position but other OX groups can be substituted. A typical degree substitution (DS) of $—RSO_3Na$ is 1 or 2 (1 or 2 $—RSO_3Na$ per glucose unit).

For example, sulfonated starch with a DS of 0.5 comprises the structure of Formula II:

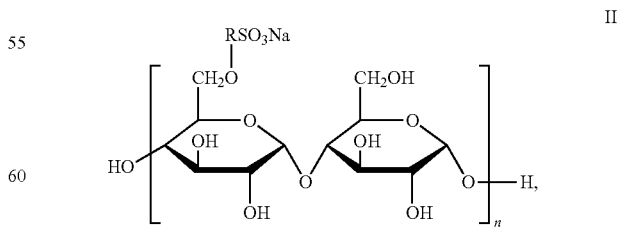

wherein although Formula II illustrates $—RSO_3Na$ as substituting at the OH group of a $CH_2OH$ moiety, the substitution by the group $—RSO_3Na$ may be at any OH group of the moiety. Likewise to Formula IA, Formulas III-IV shown below illustrate —RSO$_3$Na as substituting at the OH group of a CH$_2$OH moiety, but the substitution by the group —RSO$_3$Na may be at any OH group. Moreover, —RSO$_3$Na may substitute at one or more, typically one or two, OH groups per glucose unit of Formulas III-IV.

In Formula I and other Formulas II-IV shown herein n is 25-1,500,000. However, preferably for sulfonated starches of the present invention of Formulas I-IV if unmodified starch (also known as native starch) is used for sulfonation then n of the resulting sulfonated starch is generally more than 4,000 (4,000-1,500,000), and if acid modified starch (e.g., partially hydrolyzed starch) is used for sulfonation then n of the resulting sulfonated starch is generally 25 to 4,000, preferably 100 to 4,000, more preferably 150 to 500. In Formula I and other applicable Formulas II-IV shown herein R may be C$_2$-C$_8$ alkyl or arylalkyl (e.g., benzylalkyl), or preferably C$_2$-C$_5$ alkyl.

For example, the sulfonated starch comprises a moiety of Formula III:

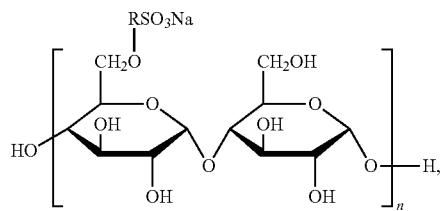

III wherein R is C$_2$-C$_4$ alkyl, X is H.

For example, the sulfonated starch comprises an amylose based structure of Formula IV:

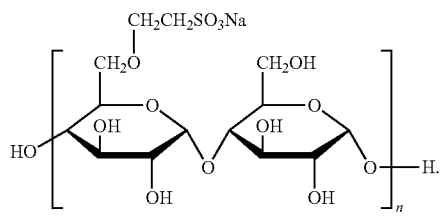

IV

For example, the sulfonated starch comprises an amylopectin based structure of Formula V:

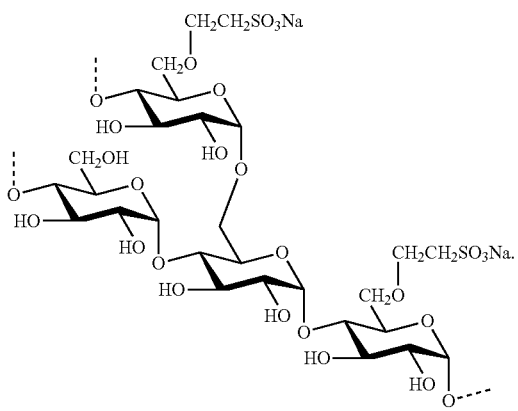

V

For example, the sulfonated starch has the following partial structure of Formula VI:

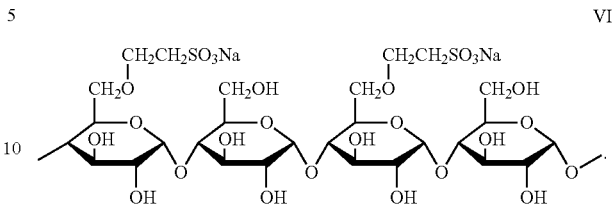

VI

In addition to the sulfonated starch, any additional binder suitable for use in joint compounds may be included in the present joint compound to help enhance the adhesion of the joint compound to its substrate, e.g., drywall, if it does not affect the tools self-cleaning effect. Acceptable binders include, but are not limited to latex emulsions, vinyl acetates, acrylics, alcohols, and dispersible powders such as poly vinyl acetate, ethylene vinyl acetates, and non-sulfonated starches.

Fillers and Other Components

At least one inert filler suitable in joint compounds may be appropriately used in the present joint compound. Such filler includes, but is not limited to calcium carbonate and calcium sulfate dihydrate common to preparation of joint compounds as known to those skilled in the art. Fillers ground to median particle size between 5 and 40 microns are typically used. The amount used is typically of from about 50% to about 95% by weight of the total ingredients not including the water added (a dried component basis), although example of filler-free compounds may exist.

Finely ground calcium carbonate is preferably used for drying-type joint compounds. It is a dry powder that usually comprises at least about 50% by dry weight of the joint compound and generally falls within the range of about 50% to 98% of the dry weight. Additional fillers such as mica, talc, such as sericite, diatomaceous earth, clays, such as attapulgite, seplite and kaolin, calcium sulfate dihydrate, and pyrophyllite may also be suitable.

Perlite or expanded perlite may be included in the present joint compound as a filler. Use of expanded perlite in a lightweight joint compound is taught in U.S. Pat. No. 4,454,267, which is incorporated herein by reference. Expanded perlite is a very lightweight material that contains many cracks and fissures. It should be specially treated according to U.S. Pat. No. 4,525,388, which is hereby incorporated by reference, so that the material does not increase in weight due to water absorbed by capillary action.

It is well known that the expanded perlite should preferably have a particle size which will pass through a 100 mesh screen if it is to be incorporated into a joint compound. In a ready-mix joint compound, the expanded perlite is optionally treated to render it water-insensitive or left uncoated. If it is advantageous to treat the expanded perlite, there are several ways to render the expanded perlite water-insensitive, one of which is disclosed in U.S. Pat. No. 4,525,388, which is incorporated herein by reference. Another method is to treat the expanded perlite with a silicone or siloxane compound, but other materials may be used to render it water-insensitive (i.e., water-repellent). Specially treated expanded perlite is commercially available from suppliers such as Silbrico Corporation, Hodgkins, Ill.

The expanded perlite should be present in an amount of at least about 1% by dry weight of the total composition to achieve desired lightweight properties. It is preferred that the expanded perlite be present in an amount between about 5% and about 10% by dry weight of the total components.

In addition to perlite or expanded perlite, the filler may comprise hollow resin microspheres having a mean particle size of less than 75 microns as lightweight filler as taught in U.S. Pat. No. 6,545,066 to Immordino et al., which is hereby incorporated by reference. In this case, a homogeneous dispersion of the microspheres in water is important to achieve a smooth, uniform surface of the finished joint compound.

A thickener suitable in joint compounds is appropriate for use in the present joint compound, which includes, but is not limited to a cellulose thickener, such as ethylhydroxy ethylcellulose, hydroxypropyl methylcellulose, methylhydroxypropyl cellulose, hydroxyethyl cellulose, methylhydroxyethyl cellulose and mixtures thereof. The amount of the cellulose thickener ranges from about 0.1% to about 3%, preferably 0.3 to 1% by dry weight of the total composition ingredients not including the water added. It is contemplated that other thickeners may be used instead of or in addition to the cellulose thickener.

A suspending agent or dispersant (or called a non-leveling agent) that is suitable in joint compounds is appropriate for use in the present joint compound, including but not limited to an attapulgite clay, e.g., MAN-U-GEL®. This ingredient provides non-leveling or anti-sag, slip, water retention, and water demand. In general, the amount of the suspending agent, if present, ranges from about 1% to about 10%, preferably 2% to 7% by weight of the total composition prior to adding water. Other clays such as sepiolite, bentonite and montmorillonite may also be used in the joint compound, in addition to or instead of the clay. Non-clay suspending agents such as the types listed in U.S. Pat. No. 5,336,318, which is incorporated herein by reference are of use in the present joint compound. Also, a synthetically made hydrous magnesium silicate creates a highly thixotropic solution when prepared in water, with excellent suspending power, preventing lightweight microspheres if used from floating to the top and separating. In addition to the use of hydrous magnesium silicate as a suspension agent, a defoaming agent may be used to minimize the level of entrained air during initial mixing and subsequent high shear tests.

It is preferable to provide for control of microbial growth in the wet medium during storage, when preparing a ready-mix joint compound. One way to reduce microbes is to introduce a biocide that kills on contact. Examples of contact-kill biocides include household bleach (6% aqueous sodium hypochlorite) or chemicals for shock treatment of swimming pools, such as lithium or calcium hypochlorite. Although these additives will kill essentially all microbes present in the joint compound at the time of manufacture, they will not prevent future microbial growth.

Conventional in-can preservatives, including triazine liquid bactericide, other bactericides, fungicides and/or other organic biocides, are used for joint compounds for continuing suppression of microbial growth. High performance in-can preservatives maintain the integrity of joint compounds from manufacturing through final application. The preservatives can be used in combination with or in place of contact-kill treatments. Combinations of preservatives are also contemplated.

Water is added in amounts selected to produce a joint compound in wet before use of a desired viscosity. Typically, the present joint compound in ready-mix form has a viscosity of 300-850, preferably 300-600 Brabender unit at room temperature. When preparing a lightweight formulation, care should be taken to minimize the amount of water in the compound. Water adds to the density of the product when the desired finished product density is less than that of the water itself. In addition, when the level of water is minimized, resistance to shrinkage and cracking is enhanced. When the microspheres are coated to aid in dispersion, the coating also contributes to the overall weight of the joint compound.

Additional ingredients typically used in joint compounds are contemplated for use in the present joint compound. These ingredients may include, but are not limited to humectants, fillers, wetting agents, kaolin, defoamers and plasticizers which are also useful in the joint compound base or in the additive blends.

Preparation of Joint Compounds

The present joint compound may be prepared in dry or ready-mix form, preferably in ready-mix form. A known preparation method of a ready-mix drying-type joint compound may be used in preparing the present joint compound invention to obtain a ready-mix drying-type joint compound comprising a composition to allow tools to easily clean up where the composition comprising a sulfonated starch as binder.

For example, the present joint compound is prepared by a method comprising mixing a sulfonated starch, water, at least one filler, a thickener, a preservative, and a suspending agent, wherein the sulfonated starch. On a dry (water free solids) basis the sulfonated starch is present in a concentration of from about 0.05% to about 10% by weight, preferably from about 0.5% to about 5% by weight, and more preferably from about 0.1 wt. % to about 3 wt. % by weight, for example 2.9 wt. %.

Also, for example, it is prepared by a method comprising: grouping components of the joint compound into dry components and wet components, the components comprising a sulfonated starch, water, at least one filler, a thickener, a preservative, and a suspending agent or dispersant; mixing the dry components together; mixing the wet components together; combining the dry and the wet components together in a main mixer to obtain a joint compound composition; and mixing the composition until it is a homogeneous mixture. On a dry (water free solids) basis the sulfonated starch is present in a concentration of from about 0.05% to about 10% by weight, preferably from about 0.05% to about 5% by weight, and more preferably from about 0.1 wt. % to about 3 wt. % by weight, for example 2.9 wt. %.

TABLE A

Joint Compound Composition on dry (water free) basis

| Ingredient | Broad (wt. %) | Preferred (wt. %) | More Preferred (wt. %) |
| --- | --- | --- | --- |
| a sulfonated starch, | about 0.05% to about 10% | about 0.05% to about 5% | about 0.1 wt. % to about 3 wt. % |
| heavy weight inorganic filler, preferably calcium carbonate and/or calcium sulfate dihydrate | 0-95 | 20-75 | 50-75 |
| lightweight, inorganic filler, for example perlite, hollow resin microspheres | 0-95 | 20-75 | 20-45 |

TABLE A-continued

Joint Compound Composition on dry (water free) basis

| Ingredient | Broad (wt. %) | Preferred (wt. %) | More Preferred (wt. %) |
|---|---|---|---|
| total of light and heavy weight fillers | 50-95 | 70-95 | 80-95 |
| thickener | about 0.05% to about 10% | about 0.1% to about 7% | 0.3 to 5% |
| suspending agent or dispersant | about 0% to about 10% | about 1% to about 10% | about 2% to about 7% |
| preservative | 0-0.5 | 0-0.3 | 0.05-0.3 |
| Water in joint compound (wt. %) | 40-75 | 40-70 | 50-70 |

Some ingredients are available in either dry or wet (liquid) form. The sulfonated starch is used in liquid form, but other fillers and optional binders are available as powders. AH components are grouped as to their physical form. The wet components are generally blended directly in the mixer. Water is placed in the mixer and first blended with the other wet components, such as the sulfonated starch binder, and other components in liquid form. The dry components generally include the fillers, thickeners, and suspending agents or dispersants. These components are blended together before addition to the mixer using any technique known in the art to blend dry ingredients together. Powder feeders are optionally used to disperse the thickeners and/or suspending agents or dispersants with the fillers as they are moved to the mixer by conveyor.

After the wet ingredients have been combined, the dry components are mixed in with the wet components in the mixer. Mixing continues until a homogeneous mixture is obtained. Additional water is added, if necessary, to achieve a desired viscosity. This viscosity will vary depending on exactly what type of joint compound is being prepared, but the target viscosity is generally between 300-850 Brabender units at room temperature.

Properties of the Joint Compound—Texture Analysis:

The present joint compound thus obtained does not adhere to the surfaces of tools allowing the tools to self-clean after use. The compound allows the tools to be incredibly easily cleaned up, as well as it shows good workability and appearance, compared to conventional ready-mix joint compounds.

A text analyzer may be used to evaluate the adherence property of the present joint compound to the surfaces of tools, as compared to other joint compounds containing conventional starch, such as non-sulfonated Starch A which is a native wheat starch, non-sulfonated Starch B which is a pregelatinized wheat starch, and non-sulfonated Starch C which is pregelatinized corn flour.

Figure 2:
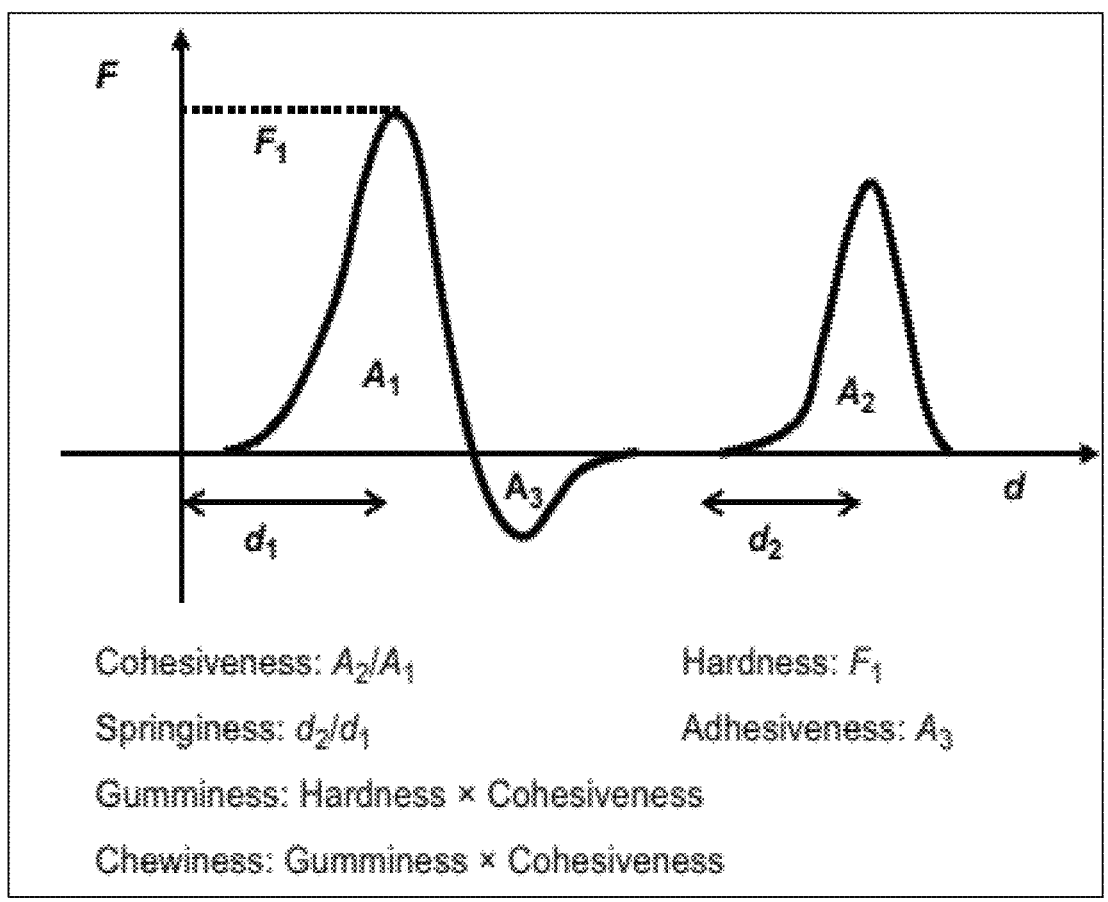
FIG. 2 shows a typical force displacement curve from Chen, J. Food Oral Processing-A Review. *Food Hydrocolloids*. 2009, 23, 1-25.

The texture analyzer test can be conducted according to a method known in the art, for example, Szeczesniak's method as described in the reference: Chen, J. Food Oral Processing-A Review. *Food Hydrocolloids*. 2009, 23, 1-25. In the method, a so-called Texturometer was used and it was demonstrated that the force-displacement curve obtained from a double-compression test (see FIG. 2) using the texture profile analysis approach (see below) gave a meaningful interpretation to a number of texture features: hardness ($F_1$), cohesiveness ($A_2/A_1$), springiness ($d_2/d_1$), viscosity, elasticity, adhesiveness ($A_3$), brittleness, chewiness (which equals Gumminess×Cohesiveness), and gumminess (which equals Hardness×Cohesiveness). It describes that one single test is capable to characterize a number of textural parameters. Szeczesniak's method was later named as Texture Profile Analysis (TPA) and is still frequently referred in literature as a standard method for texture characterization. FIG. 2 shows a typical force-displacement curve obtained from a double-compression test using the texture profile analysis approach. One single test is capable of characterizing a number of textural parameters. Springiness listed in FIG. 2 relates to elasticity.

Other methods known in the art to evaluate the adhesiveness of a joint compound may also be used.

Figure 3:
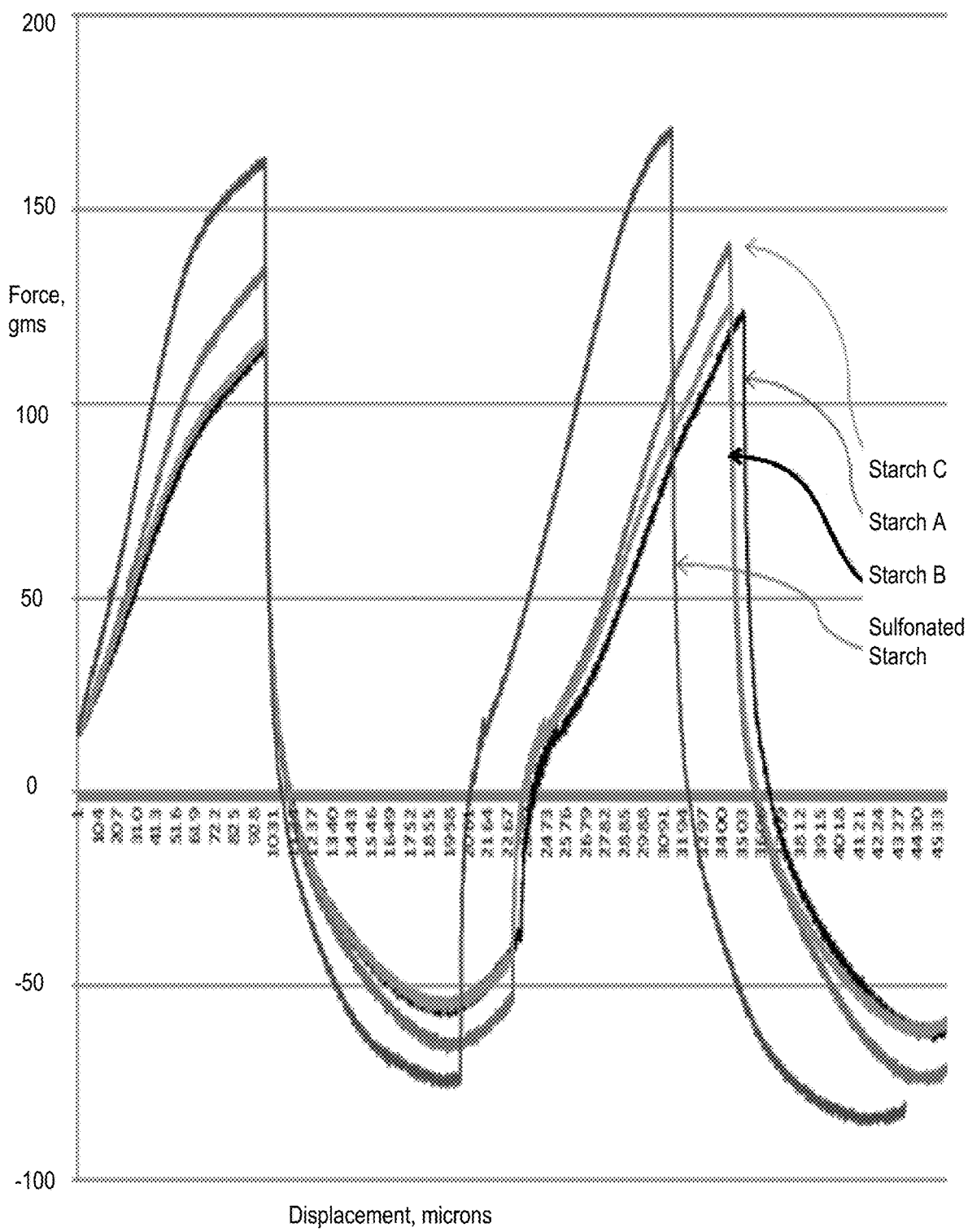
FIG. 3 illustrates force displacement curves showing test results by a texture analyzer measuring the adherence of a joint compound according to one embodiment of the present invention to evaluate tools self-clean effect, compared to conventional joint compounds containing the non-sulfonated starch non-sulfonated Starch A which is a native wheat starch, non-sulfonated Starch B which is a pregelatinized wheat starch, and non-sulfonated Starch C which is pregelatinized corn flour. The arrow on the graph points out the abnormality between the compounds prepared with the sulfonated starch according to the present invention and the other three compounds.

FIG. 3 shows the results obtained from the texture analyzer method, with the present joint compound and other joint compounds for comparison. As shown in the graphs, the present sulfonated starch based joint compound shows higher point of the graph and the intercept point showed earlier on the x-axis, which indicates that the present joint compounds allows tools to more easily self-clean. The arrow on the graph points out the abnormality between the compound made with the sulfonated starch and other compounds. In the removal phase of the test, the compound comes away from the ball and reaches 0 load earlier than the others, this is consistent with the result that it is self-cleaning.

The present joint compound does not adhere to the non-porous surfaces at all, it rinses off with no scrubbing or even wiping required.

The following examples are presented to further illustrate some preferred embodiments of the invention and to compare them with conventional methods and compositions outside the scope of the invention. The invention is not limited by the following examples but rather is defined by the claims appended hereto.

EXAMPLES

Example 1

Preparation of Sulfonated Starch

In the examples starch was added to water in which sodium hydroxide are dissolved. Then sodium vinyl sulfonate, dissolved in water, are added to the mixture. The mixture obtained is heated to the temperature of about 90° C. for about 4 hours, with stirring when needed. Then, the resulting mixture including the prepared sulfonated starch was cooled down to room temperature. For the examples the pH of the resulting mixture including the prepared sulfonated starch was about 12.

The prepared sulfonated starch was diluted with water to a 25 wt. % solution.

Example 2

Preparation of Joint Compounds

Control

A conventional joint compound using a non-sulfonated starch USG-95 was prepared as control with the components in the amounts described in TABLE 1 below.

Sulfonated Starch-Joint Compound

The present joint compound was prepared with the components and the amounts listed in Table 1, below, where the components are the same as those in conventional joint compound except for the starch. In the example, the dry ingredients were mixed. The liquid ingredients were blended (liquid starch solution, water and triazine preservative). Then the dry mixture was added to the liquid mixture and the resulting blend was mixed in a Hobart mixer.

While a non-sulfonated Starch C which is pregelatinized corn flour was used in the conventional joint compound control, a sulfonated starch solution of sodium starch vinyl sulfonate was used in the present joint compound. Also, while the amount of the non-sulfonated Starch C was 23.62 gram in the conventional joint compound, the amount of the sulfonated starch solution is 94.48 gram in the present joint compound. Water was added by two steps. The amount of first water in the conventional joint compound control was 400 grams while it was reduced to 270 grams in the present joint compound because the sulfonated starch had water in it. The second water and the total water amounts were the same amount in both compositions.

When preparing the present joint compounds with the components in Table 1, the dry components of 750 g of calcium carbonate of average particle size of about 14 to 20 microns, 10.18 g of expanded perlite, 25.51 g of attapulgite clay (commercially available hydrous magnesium aluminum silicate), 2.44 g of hydroxypropyl methyl cellulose ether, and 0.56 g of hydroxyethyl cellulose were added to a mixer and 270 grams of water is added to mix the components. Then, the wet components of 94.48 grams (including water) of a sulfonated starch solution and 1.5 grams of commercially available bactericide were added to another mixer and then mixed together. The mixture of the dry components with water and the liquid mixture were combined in a main mixer, then was adding 40 grams of second water and the resulting mixture blended with the Hobart blender until the combined mixture forms a homogenous mixture. 25 grams of water was then added for the final homogenous mixture.

TABLE 1

| Ready-Mix | Control (g) amount | wt. % | Sulfonated (g) amount | wt. % |
|---|---|---|---|---|
| Calcium Carbonate | 750 | 92.33% | 750 | 92.33% |
| Perlite | 10.18 | 1.25% | 10.18 | 1.25% |
| Attapulgite clay | 25.51 | 3.14% | 25.51 | 3.14% |
| Hydroxypropyl Methyl cellulose | 2.44 | 0.30% | 2.44 | 0.30% |
| Hydroxyethyl cellulose | 0.56 | 0.07% | 0.56 | 0.07% |
| Starch C (solids) | 23.62 | 2.91% | — | 0.00% |
| Sulfonated starch (25% starch solution) | — | 0.00% | 94.48 | 2.91% |
| Triazine | 1.5 | | 1.5 | |
| Water | 487.5 | | 487.5 | |
| First water addition | 400 | | 270 | |
| Second water addition | 40 | | 40 | |
| Total (Dry, water free basis) | 812 | | 812.31 | |

Example 3

Performance Test

The present joint compound prepared by the method in Example 2 was tested for performance properties, with the conventional joint compound prepared in Example 2 as control. The properties tested include density, viscosity, appearance, application viscosity, cracking, shrinkage, texture analyzer cohesiveness, and sandability.

The density and Brookfield viscosity (in Brabender units) of the present joint compound and the control conventional joint compound was measured. The initial viscosity of the homogenous mixture and the application viscosity of the final joint compound were each measured. TABLE 2 lists measured properties of the control and invention joint compounds. The properties were measured according to ASTM C474. Compared to the control, the sulfonated starch based joint compound of the present invention showed a slightly increased density (1.45 vs 1.55 g/cc) and a higher viscosity (359.7 vs 474.9 Brabender units (BU)).

The test results are summarized in TABLE 2.

TABLE 2

Properties of Sulfonated Starch Based Joint Compound

| | Control Joint Compound | Sulfonated Starch Joint Compound |
|---|---|---|
| Density at manufacture (g/ml) | 1.45 | 1.55 |
| Viscosity at manufacture (BU) | 359.7 | 474.9 |
| Density at 24 hours after manufacture (g/ml) | 1.51 | 1.57 |
| Viscosity at 24 hours after manufacture (BU) | 414.6 | 554.7 |
| Application viscosity (BU) | 298.7 | 306.6 |
| Cracking | 5% | 0% |
| Shrinkage | 35.45% | 22.74% |
| Texture analyzer cohesiveness* | 0.921 | 1.300 |
| Sandability | Hard | Hard |
| Tape bond 55/50 (T° F./RH %) | 97% | 85% |
| Application | Good-slick smooth easy | Behaves like the control compound; allows the tools to clean up easily. |

*The texture analyzer cohesiveness test was conducted according to the method described in the reference, Chen, J. Food Oral Processing-A Review. *Food Hydrocolloids*. 2009, 23, 1-25.

TABLE 2 shows performance properties of the present joint compound containing a sulfonated starch as binder, compared to a conventional joint compound. As seen from the data in TABLE 2, the present joint compound performs well when it is applied, compared to the control containing binder of a non-sulfonated starch.

Example 4

Texture Analyzer Test and Tools Cleaning-up

Four drying-type joint compounds having different starches as binder, i.e., three joint compounds each having starch commonly used in joint compounds non-sulfonated Starch A which is a native wheat starch, non-sulfonated Starch B which is a pregelatinized wheat starch, and non-sulfonated Starch C which is pregelatinized corn flour and a joint compound having the sulfonated starch according to the present invention were tested with a texture analyzer to evaluate the property of adherence to the surface of the tools. The texture analyzer test was conducted according to the method described in the reference, Chen, J. Food Oral Processing—A Review. *Food Hydrocolloids*. 2009, 23, 1-25. Other known methods may also be used.

The texture analyzer inserts a round ball to record the load, and this test is done in two segments: the first is inserted and then removed, and then it is inserted again.

As seen from the result graphs depicted in force-displacement diagrams of FIG. 3, the sulfonated starch based joint compound according to the present invention allows tools to easily self-clean. The arrow on the graph points out the abnormality between the joint compound made with the sulfonated starch and other compounds. In the removal phase of the test, the joint compound comes away from the ball and reaches 0 load earlier than the others, this is consistent with the result that it is self-cleaning.

The joint compound prepared with the sulfonated starch according to the present invention shows an effect that allows the tools clean up easily. The joint compound does not adhere to the non-porous surfaces at all, it rinses off with no scrubbing or even wiping required.

What is claimed is:

1. A joint compound having a composition to allow tools to easily clean up, comprising
at least one inert filler, wherein the at least one inert filler comprises at least one of calcium carbonate, dolomite, gypsum, perlite, mica, talc, sericite, diatomaceous earth, clay, attapulgite clay, sepiolite, kaolin, calcium sulfate dihydrate, and pyrophyllite, and
a sulfonated starch binder present in the composition in a concentration of from about 0.05% to about 10% by weight on a dry (water free solids) basis;
wherein the sulfonated starch binder comprises the moiety —$CH_2O$—X, X is —$RSO_3Na$ or —H, wherein at least one X is —$RSO_3Na$, and the R is $C_2$-$C_{18}$ alkyl or arylalkyl,
wherein the composition has an absence of plant protein.

2. The joint compound of claim 1, wherein the sulfonated starch binder comprises the moiety
—$CH_2O$—($C_2$-$C_{18}$ alkyl or arylalkyl)-$SO_3Na$;
wherein the sulfonated starch binder is present in the composition in a concentration of from about 2.9 to about 5% by weight on a dry (water free solids) basis, where all binder of the composition consists of said sulfonated starch binder and optionally at least one additional binder selected from latex binder, vinyl acetates, acrylics, polyvinyl alcohols, and poly vinyl acetate dispersible powders, ethylene vinyl acetates dispersible powders, and non-sulfonated starches.

3. The joint compound of claim 1, wherein the sulfonated starch binder comprises a repeating unit of Formula I:

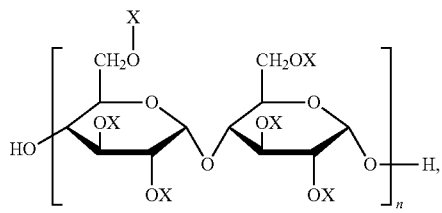

wherein X is —$RSO_3Na$ or —H, wherein at least one X is —$RSO_3Na$, and the R is $C_2$-$C_{18}$ alkyl or arylalkyl, and n is between 25-1,500,000.

4. The joint compound of claim 1, wherein the sulfonated starch binder comprises a repeating unit of formula II:

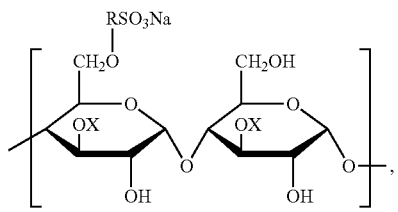

wherein R is $C_2$-$C_{18}$ alkyl or arylalkyl, X is H.

5. The joint compound of claim 1, wherein the sulfonated starch binder comprises an amylose based structure of formula III:

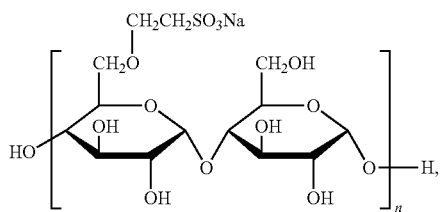

wherein n is between 25-1,500,000.

6. The joint compound of claim 1, wherein the sulfonated starch binder comprises an amylose based moiety of formula IV:

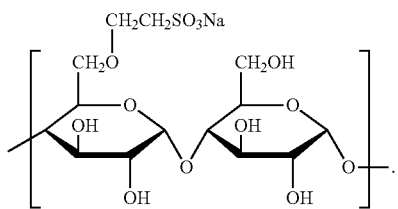

7. The joint compound of claim 1, wherein the sulfonated starch binder comprises an amylopectin based moiety of formula V:

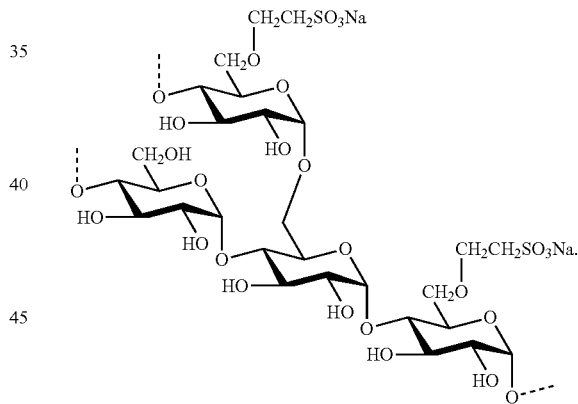

8. The joint compound of claim 1, wherein the sulfonated starch binder comprises the moiety of formula VI:

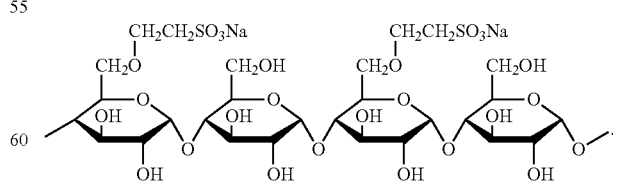

9. The joint compound of claim 1, wherein the sulfonated starch binder comprises a sodium vinyl sulfonate moiety.

10. A joint compound having a composition to allow tools to easily clean up, wherein the composition consists of:

at least one inert filler wherein the at least one inert filler is at least one of calcium carbonate, dolomite, gypsum, perlite, mica, talc, sericite, diatomaceous earth, clay, attapulgjte clay, sepiolite, kaolin, calcium sulfate dehydrate, and pyrophyllite, and a sulfonated starch binder present, in the composition in a concentration of from about 0.05 to about 10% by weight on a dry (water free solids) basis, and optionally at least one additional binder selected from latex binder, vinyl acetates, acrylics, polyvinyl alcohols, and poly vinyl acetate dispersible powders, ethylene vinyl acetates dispersible powders, and non-sulfonated starches;

wherein the sulfonated starch binder comprises the moiety —$CH_2$O—X, X is —$RSO_3$Na or —H, wherein at least one X is —$RSO_3$Na, and the R is $C_2$-$C_{18}$ alkyl or arylalkyl, optionally at least one of a thickener, a preservative, a pH modifier, a pigment, a PEG 400-PEG 1000 polyethylene glycol, suspending agent and dispersant;

wherein the thickener is cellulose compound, wherein the preservative is at least one of a bactericide, a fungicide, and biocide, wherein the suspending agent or dispersant is at least one of clay and hydrous magnesium silicate, optionally at least one of humectants, wetting agents, kaolin, defoamers and plasticizers, and optionally water.

11. A joint compound having a composition to allow tools to easily clean up, comprising:

at least one inert filler, wherein the at least one inert filler comprises at least one of calcium carbonate, dolomite, gypsum, perlite, mica, talc, sericite, diatomaceous earth, clay, attapulgite clay, sepiolite, kaolin, calcium sulfate dihydrate, and pyrophyllite, and a sulfonated starch binder present in the composition in a concentration of from about 0.05 to about 10% by weight on a dry (water free solids) basis;

wherein the sulfonated starch binder comprises the moiety —$CH_2$O—X, X is —$RSO_3$Na or —H, wherein at least one X is —$RSO_3$Na, and the R is $C_2$-$C_{18}$ alkyl or arylalkyl wherein all binder of the composition consists of said sulfonated starch binder and optionally at least one additional binder selected from latex binder, vinyl acetates, acrylics, polyvinyl alcohols, and poly vinyl acetate dispersible powders, ethylene vinyl acetates dispersible powders, and non-sulfonated starches.

12. The joint compound of claim 1, further comprising a thickener, a preservative, and/or a suspending agent or dispersant, wherein the thickener is a cellulose thickener, wherein the cellulose thickener is ethylhydroxy ethylcellulose, hydroxypropyl methylcellulose, methylhydroxypropyl cellulose, hydroxyethyl cellulose, methylhydroxyethyl cellulose, or a mixture thereof.

13. The joint compound of claim 10, wherein the sulfonated starch binder is present in the composition in a concentration of from about 0.1 to about 5% by weight on a dry (water free solids) basis.

14. The joint compound of claim 10, wherein the composition consists of:

the at least one inert filler, the sulfonated starch binder, optionally at least one of the thickener, the preservative, the pH modifier, the pigment, suspending agent and the dispersant;

wherein the thickener is cellulose compound, wherein the cellulose thickener compound is ethylhydroxy ethylcellulose, hydroxypropyl methyl cellulose, methylhydroxypropyl cellulose, hydroxy ethyl cellulose, methyl hydroxy ethyl cellulose, or a mixture thereof, wherein the preservative is at least one of a bactericide, a fungicide, and biocide, wherein the suspending agent or dispersant is at least one of clay and hydrous magnesium silicate, optionally at least one of humectants, wetting agents, kaolin, defoamers and plasticizers, and optionally water.

15. The joint compound of claim 14, wherein the sulfonated starch binder is present in the composition in a concentration of from about 2.9 to about 5% by weight on a dry (water free solids) basis.

16. The joint compound of claim 1, wherein the composition is a ready-mix drying-type joint compound composition comprising calcium carbonate as the at least one inert filler, the binder, and water.

17. The joint compound of claim 1, wherein the composition is a ready-mix drying-type lightweight joint compound composition wherein the filler comprises a heavyweight inorganic filler, an expanded perlite, and optionally a lightweight filler other than the perlite, and further comprising water.

18. The joint compound of claim 1, as a ready-mix drying-type joint compound, wherein the at least one inert filler comprises calcium carbonate, and further comprising water, a thickener comprising a cellulose compound, a preservative comprising a bactericide, and a suspending agent or dispersant.

19. A process for preparing a joint compound of claim 1 having a composition to allow tools to easily clean up comprising: mixing a sulfonated starch binder, water, at least one filler, a thickener, a preservative, and a suspending agent, wherein the sulfonated starch binder is present in the composition in a concentration of from about 0.05% to about 10% by weight on a dry (water free solids) basis.

20. The joint compound of claim 1, wherein the sulfonated starch binder is present in the composition in a concentration of from about 0.1 to about 5% by weight on a dry (water free solids) basis.

* * * * *